(12) United States Patent
Lai (10) Patent No.: US 7,362,521 B2
(45) Date of Patent: Apr. 22, 2008

(54) LENS MODULE AND ELECTRONIC DEVICE USING THE SAME

(75) Inventor: Dah-Prong Lai, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 11/712,909

(22) Filed: Mar. 2, 2007

(65) Prior Publication Data

US 2007/0242371 A1 Oct. 18, 2007

(30) Foreign Application Priority Data

Mar. 30, 2006 (TW) .............................. 95111298 A (51) Int. Cl.
*G02B 7/02* (2006.01)
*G02B 15/14* (2006.01)
*G03B 13/18* (2006.01)
*G03B 13/00* (2006.01)

(52) U.S. Cl. ...................... 359/823; 359/822; 359/826; 359/694; 396/85; 396/89; 396/107; 353/101; 355/62

(58) Field of Classification Search ........ 359/822–826, 359/694, 417; 355/62, 68, 69; 353/7, 83, 353/100, 101, 106–108, 116, 120; 396/55, 396/73, 85, 89, 99, 107, 116, 131, 148, 460, 396/354, 182, 177, 458, 144, 298, 332, 335, 396/349, 355, 389, 509; 356/12, 43, 51; 250/347; 430/5, 8, 311
See application file for complete search history.

(56) References Cited

U.S. PATENT DOCUMENTS

| | | | | |
|---|---|---|---|---|
| 3,006,243 | A * | 10/1961 | Zillmer | 353/101 |
| 3,227,039 | A * | 1/1966 | Simmon | 355/62 |
| 3,522,981 | A * | 8/1970 | Teubner et al. | 359/826 |
| 3,610,128 | A * | 10/1971 | Bellows | 396/107 |
| 5,339,126 | A * | 8/1994 | Shimose | 396/85 |
| 6,535,690 | B2 * | 3/2003 | Tanabe | 396/62 |

\* cited by examiner

*Primary Examiner*—Loha Ben
(74) *Attorney, Agent, or Firm*—Rabin & Berdo, PC (57) ABSTRACT

A lens module includes a frame, a guide bar, a lever, a first lens and a second lens. The frame is for carrying an image sensor with a photosensitive surface. The guide bar is disposed on one side of the frame and parallel to a normal of the photosensitive surface. The lever includes a pivot part coupled with the frame and an extended part capable of rotating around the pivot part. The first lens and the second lens coupled with the guide bar are leaned against the extended part. When the extended part rotates around the pivot part, the extended part drives the first lens and the second lens to slide along the guide bar, for changing a first distance between the first lens and the photosensitive surface and changing a second distance between the second lens and the photosensitive surface.

22 Claims, 6 Drawing Sheets

LENS MODULE AND ELECTRONIC DEVICE USING THE SAME

This application claims the benefit of Taiwan application Serial No. 95111298, filed Mar. 30, 2006, the subject matter of which is incorporated herein by reference.

BACKGROUND OF THE INVENTION

1. Field of the Invention

The invention relates in general to a lens module and an electronic device using the same, and more particularly to a lens module with a lever driving a lens and an electronic device using the same.

2. Description of the Related Art

Lenses are used for capturing images. Light is focused on a photosensitive surface of an image sensor by the lens to form an image on the photosensitive surface. The lens may be composed of several to dozens of concave lenses and convex lenses. The concave lenses and the convex lenses produce a focal length. As to a zoom lens, the focal length of the zoom lens is adjustable by changing a distance between the concave lenses and the convex lenses, and the image on the photosensitive surface of the image sensor is enlarged or reduced by the different focal length. It is very convenient for users to use the lens in various situations. Therefore, the zoom lenses are widely applied to all kinds of electronic devices with camera function.

Figure 1:
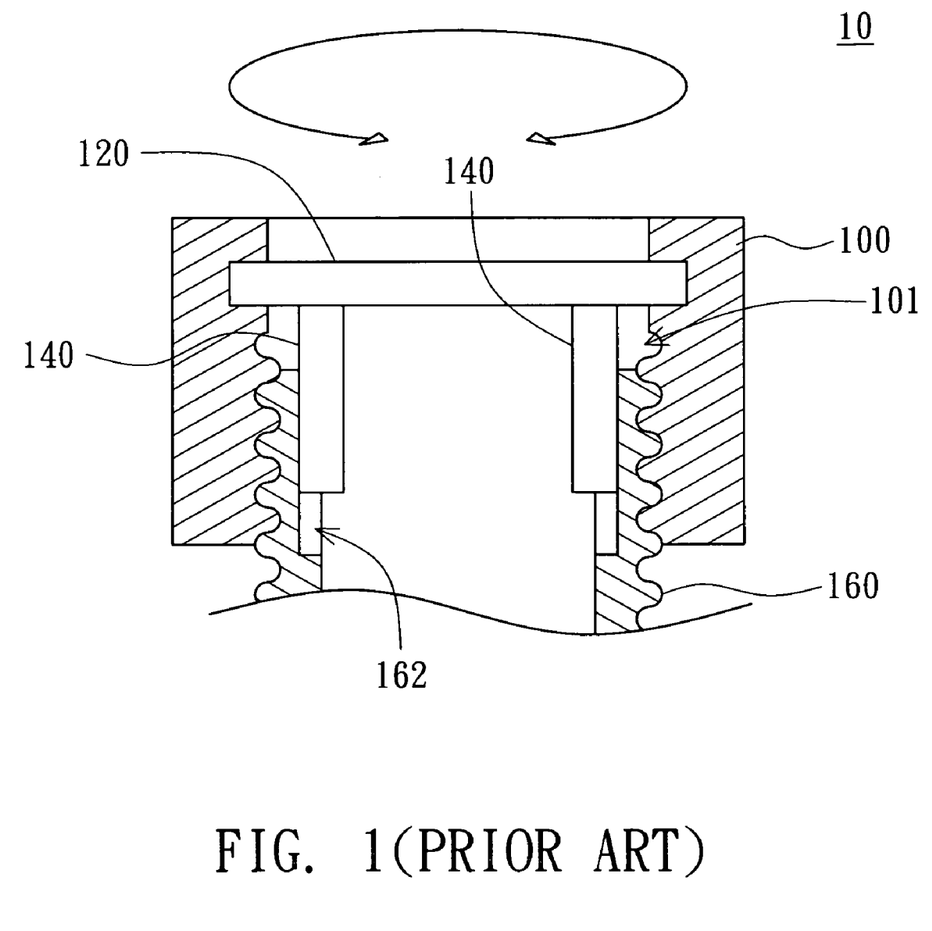
FIG. 1 (Prior Art) illustrates a conventional zoom lens.

Please referring to FIG. 1, a conventional zoom lens is illustrated in FIG. 1. The conventional zoom lens 10 includes a cam tube 100, a lens 120 and a lens tube 160. Light passes through the lens 120 and the lens tube 160 to reach an image sensor. A spiral groove 101 is formed on the cam tube 100 for connecting the cam tube 100 with the lens tube 160. Due to the characteristic of the spiral movement, when the cam tube 100 rotates, the cam tube 100 moves upwards or downwards along the lens tube 160. The lens 120 is disposed inside the cam tube 100. Therefore, the position of the lens 120 is adjusted by changing the related locations of the cam tube 100 and the lens tube 160. The conventional zoom lens 10 further includes a sliding bump 140. The sliding bump 140 is coupled with the lens 120. A strip groove 162 is formed on the lens tube 160. The sliding bump 140 located in the strip groove 162 allows the lens 120 to slide along the strip groove 162. Therefore, when the cam tube 100 rotates, the sliding bump 140 and the strip groove 162 restrain the movement of the lens 120. That is, the lens 120 only moves upwards or downwards. The lens 120 does not sway when the focal length is changed, and the image quality is not affected.

However, it is difficult to manufacture the spiral groove 101 because the spiral groove 101 requires high accuracy in the manufacturing process. Therefore, the manufacturing cost of the cam tube 100 is relatively high. After the cam tube 100 is manufactured, it is also hard to check the dimension of the cam tube 100 such that the inspection cost is high as well. Additionally, when defective cam tubes are processed in the following manufacturing process, it results in defective semi-products, which increase the manufacturing cost. Therefore, it is very important to resolve the above problems.

SUMMARY OF THE INVENTION

The invention is directed to a lens module and an electronic device using the same. The electronic device may be a camera. The sensing distances of lenses in the lens module are adjustable by using a lever. The simple structure of the lever may increase the efficiency of assembling the lens module, and the manufacturing cost of the components in the lens module is reduced.

According to the present invention, a lens module is provided. The lens module includes a frame, a guide bar, a lever, a first lens and a second lens. The frame is for carrying an image sensor having a photosensitive surface. The guide bar disposed on one side of the frame is parallel to a normal of the photosensitive surface. The lever includes a pivot part and an extended part. The pivot part is coupled with the frame. The extended part is capable of rotating around the pivot part. The first lens coupled with the guide bar to slide along the guide bar is leaned against the extended part. There is a first distance between the first lens and the photosensitive surface. The second lens coupled with the guide bar to slide along the guide bar is leaned against the extended part. There is a second distance between the second lens and the photosensitive surface. When the extended part rotates around the pivot part, the extended part drives the first lens and the second lens to move along the guide bar, for changing the first distance and the second distance. When the second lens moves along the guide bar for changing the second distance, the second lens drives the extended part to rotate around the pivot part. Also, the first lens is driven to move along the guide bar for changing the first distance.

According to the present invention, an electronic device is provided. The electronic device includes a driving unit and a lens module. The lens module is coupled with the driving unit. The lens module includes at least a frame, a guide bar, a lever, a first lens and a second lens. The frame is for carrying an image sensor. The image sensor has a photosensitive surface. The guide bar disposed on one side of the frame is parallel to a normal of the photosensitive surface. The lever includes a pivot part and an extended part. The pivot part is coupled with the frame. The extended part is capable of rotating around the pivot part. The first lens coupled with the guide bar to slide along the guide bar is leaned against the extended part. There is a first distance between the first lens and the photosensitive surface. The second lens coupled with the guide bar to slide along the guide bar is leaned against the extended part. There is a second distance between the second lens and the photosensitive surface. When the driving unit drives the extended part to rotate around the pivot part, the extended part drives the first lens and the second lens to move along the guide bar, for changing the first distance and the second distance. When the driving unit drives the second lens to move along the guide bar for changing the second distance, the second lens drives the extended part to rotate around the pivot part. Also, the first lens is driven to move along the guide bar, for changing the first distance.

The invention will become apparent from the following detailed description of the preferred but non-limiting embodiments. The following description is made with reference to the accompanying drawings.

DETAILED DESCRIPTION OF THE INVENTION

A lens module and an electronic device using the same are provided by the present invention. A lever is used for adjusting sensor distances of the lens module. Drawings are appended to illustrate the lens module and the electronic device using the same according to embodiments of the present invention.

First Embodiment

Figure 2:
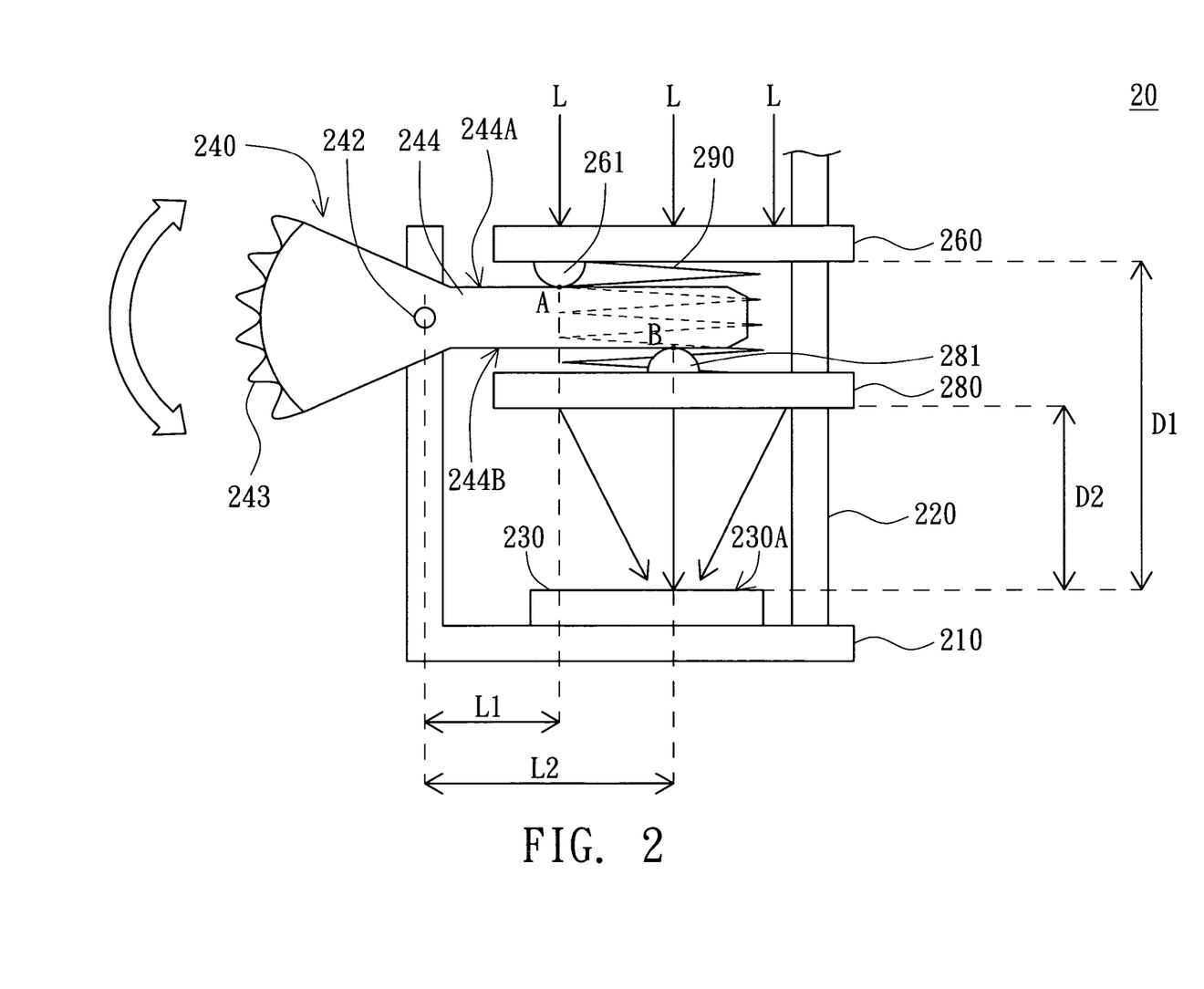
FIG. 2 illustrates a lens module according to a first embodiment of the present invention.

FIG. 2 illustrates a lens module according to a first embodiment of the present invention. Please referring to FIG. 2, the lens module 20 includes a frame 210, a guide bar 220, a lever 240, a first lens 260 and a second lens 280. The frame 210 is for carrying an image sensor 230. The image sensor 230 has a photosensitive surface 230A. The guide bar 220 disposed on one side of the frame 210 is parallel to a normal of the photosensitive surface 230A. The lever 240 includes a pivot part 242 and an extended part 244. The pivot part 242 is coupled with the frame 210. The extended part 244 is capable of rotating around the pivot part 242.

The extended part 244 has a first surface 244A and a second surface 244B. The second surface 244B is opposite to the first surface 244A and located under the first surface 244A. One end of the first lens 260 is coupled with the guide bar 220, and the other end is leaned against the first surface 244A at a first position A through a first bump 261. There is a first moment arm L1 between the first position A and the pivot part 242. Similarly, one end of the second lens 280 is coupled with the guide bar 220, and the other end is leaned against the second surface 244B at a second position B through a second bump 281. There is a second moment arm L2 between the second position B and the pivot part 242. The first moment arm L1 is shorter than the second moment arm L2. Also, there is a first distance D1 between the first lens 260 and the photosensitive surface 230A, and there is a second distance D2 between the second lens 280 and the photosensitive surface 230A. Light L passes through the first lens 260 and the second lens 280 to reach the image sensor 230. As a result, an image is formed on the image sensor 230.

Preferably, the guide bar 220 has a non-circular cross-section, such as a rectangular cross-section or an ellipse cross-section. Therefore, the first lens 260 and the second lens 280 only move along the guide bar 220 without swaying.

The module lens 20 further includes an elastic element 290, such as a spring. One end of the elastic element 290 is coupled with the first lens 260, and the other end is coupled with the second lens 280. The elastic element 290 is used for providing an elastic force, so that the first lens 260 and the second lens 280 are closely leaned against the first surface 244A and the second surface 244B respectively.

As shown in FIG. 2, the pivot part 242 of the lever 240 preferably includes a tooth-shape structure 243. Preferably, the lens module 20 further includes a deceleration device. One part of the deceleration device engages with the tooth-shape structure 243, and another part of the deceleration device is coupled with a driving unit. The driving unit drives the extended part 244 to rotate around the pivot part 242 through the deceleration device and the tooth-shape structure 243. The driving unit is a stepping motor for example.

The deceleration device is preferably composed of several gears for decreasing the output rotational speed of the stepping motor.

Figure 3A:
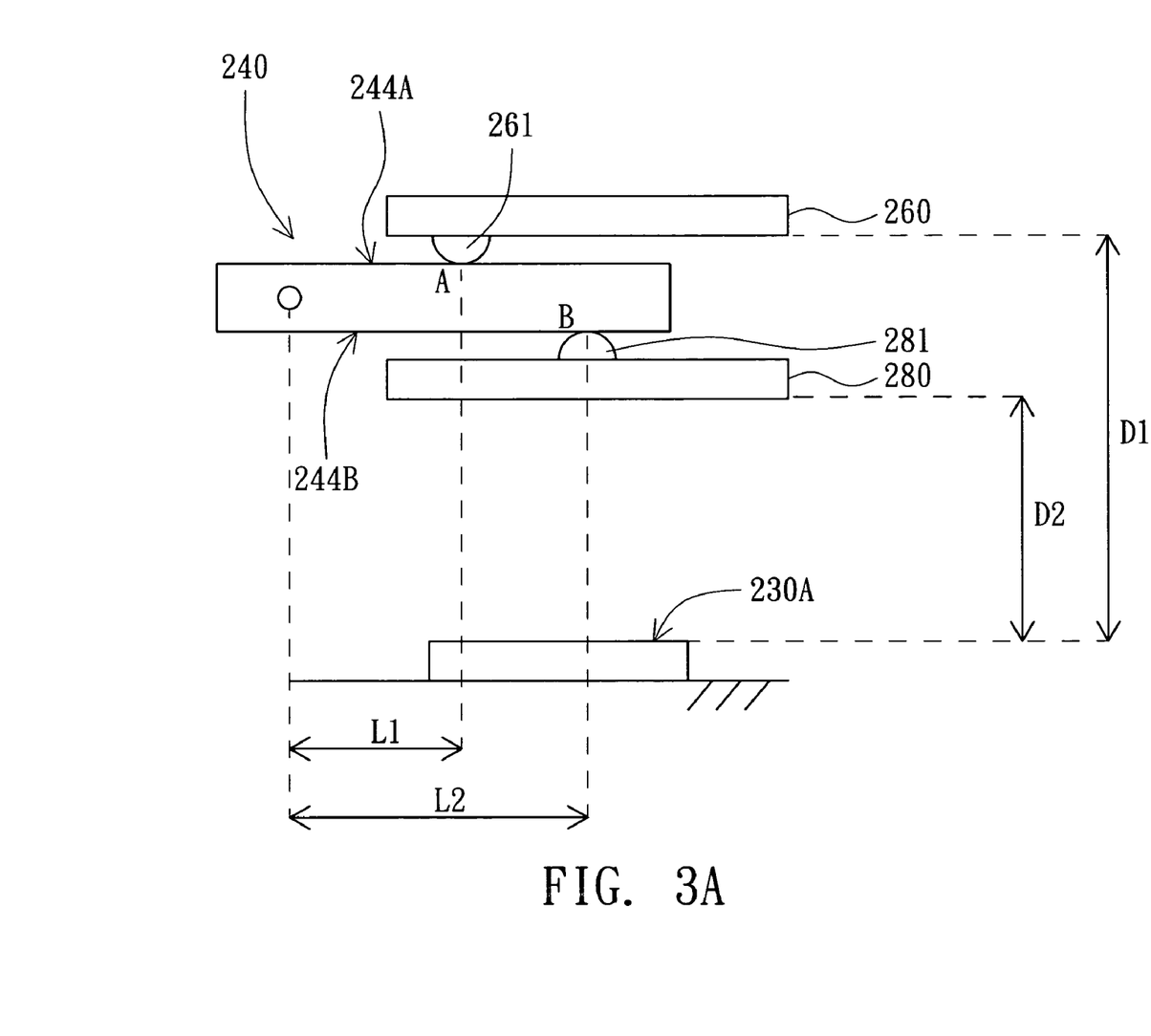
FIGS. 3A~3B illustrate the movement of a lever in FIG. 2.
Figure 3B:
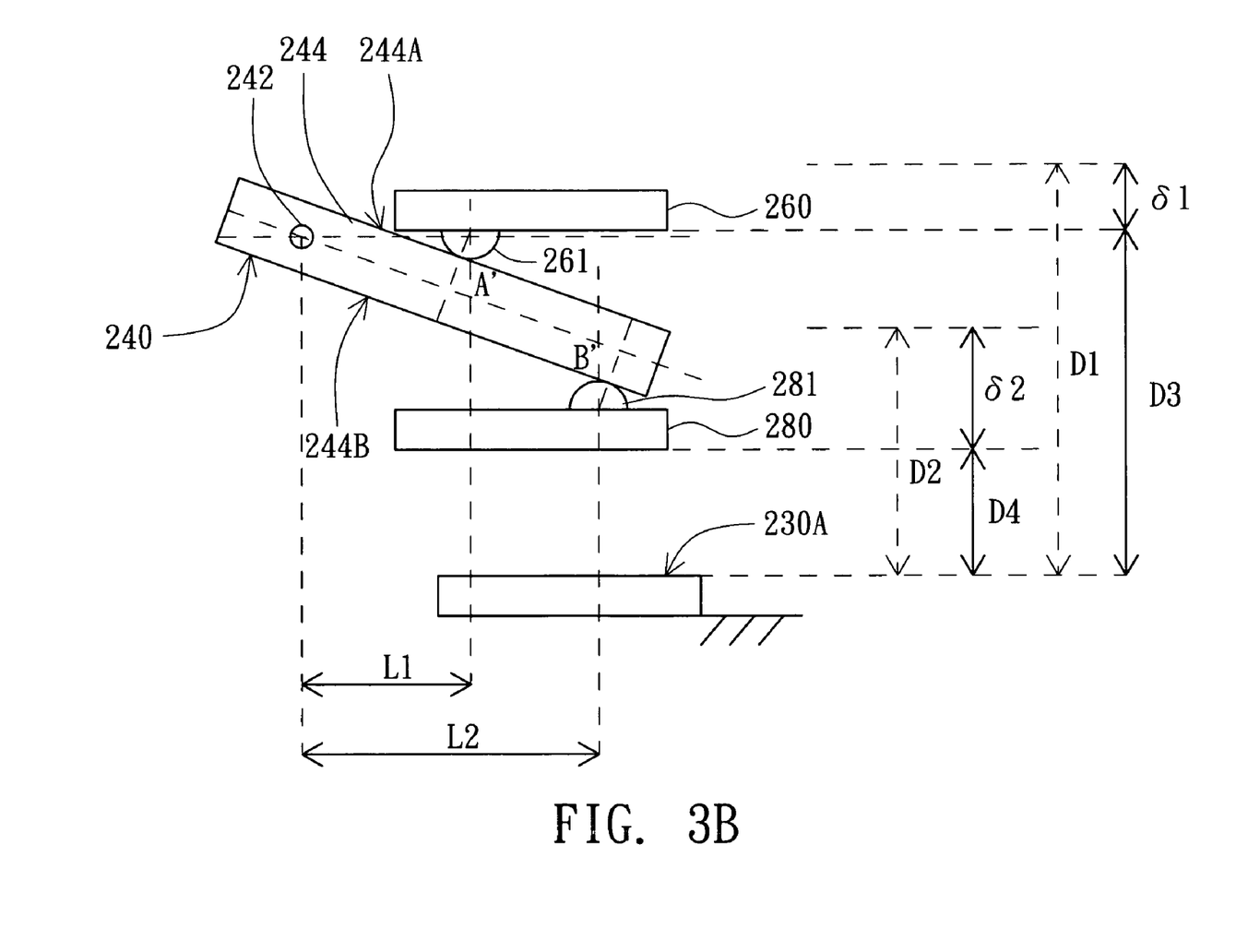

FIGS. 3A~3B illustrate the movement of the lever in FIG. 2. As shown in FIG. 3A, before the lever 240 moves, the first bump 261 is leaned against the first surface 244A at the first position A. The first moment arm L1 is the perpendicular distance from the first bump 261 to the pivot part 242, and the first distance D1 is the distance from the first lens 260 to the photosensitive surface 230A. The second bump 281 is leaned against the second surface 244B at the second position B. The second moment arm L2 is the perpendicular distance from the second bump 281 to the pivot part 242, and the second distance D2 is the distance from the second lens 280 to the photosensitive surface 230A.

As shown in FIG. 3B, when the driving unit drives the extended part 244 to rotate an angle θ around the pivot part 242 clockwise, the first lens 260 leaned against the first surface 244A slides along the first surface 244A from the first position A to the first position A'. The second lens 280 leaned against the second surface 244B slides from the second position B to the second position B'.

Because the guide bar 220 restrains the movement of the first lens 260 and the second lens 280, the first lens 260 and the second lens 280 move along the guide bar 220 without swaying, as shown in FIG. 2. Therefore, when the lever 240 drives the first lens 260 and the second lens 280 to move upwards or downwards, the first moment arm L1 and the second moment arm L2 do not change, as shown in FIG. 3B. Afterwards, there is the first distance D3 between the first lens 260 and the image sensor 230. Similarly, there is the second distance D4 between the second lens 280 and the image sensor 230. In design, because the first moment arm L1 is less than the second moment arm L2, a first variation δ1 between the first distance D1 and the first distance D3 is less than a second variation δ2 between the second distance D2 and the second distance D4. Through the geometric design, the first variation δ1 is different from the second variation δ2 to meet the corresponding relation of the optical design in the present embodiment.

Through the parameter setting of the first moment arm L1, the second moment arm L2 and the rotation angle θ, the corresponding first position A, the second position B, the first distance D1/D3 and the second distance D2/D4 are obtained. As a result, the focal length of the lens module 20 is adjustable through a simple structure design of the lever 240.

Second Embodiment

Figure 4:
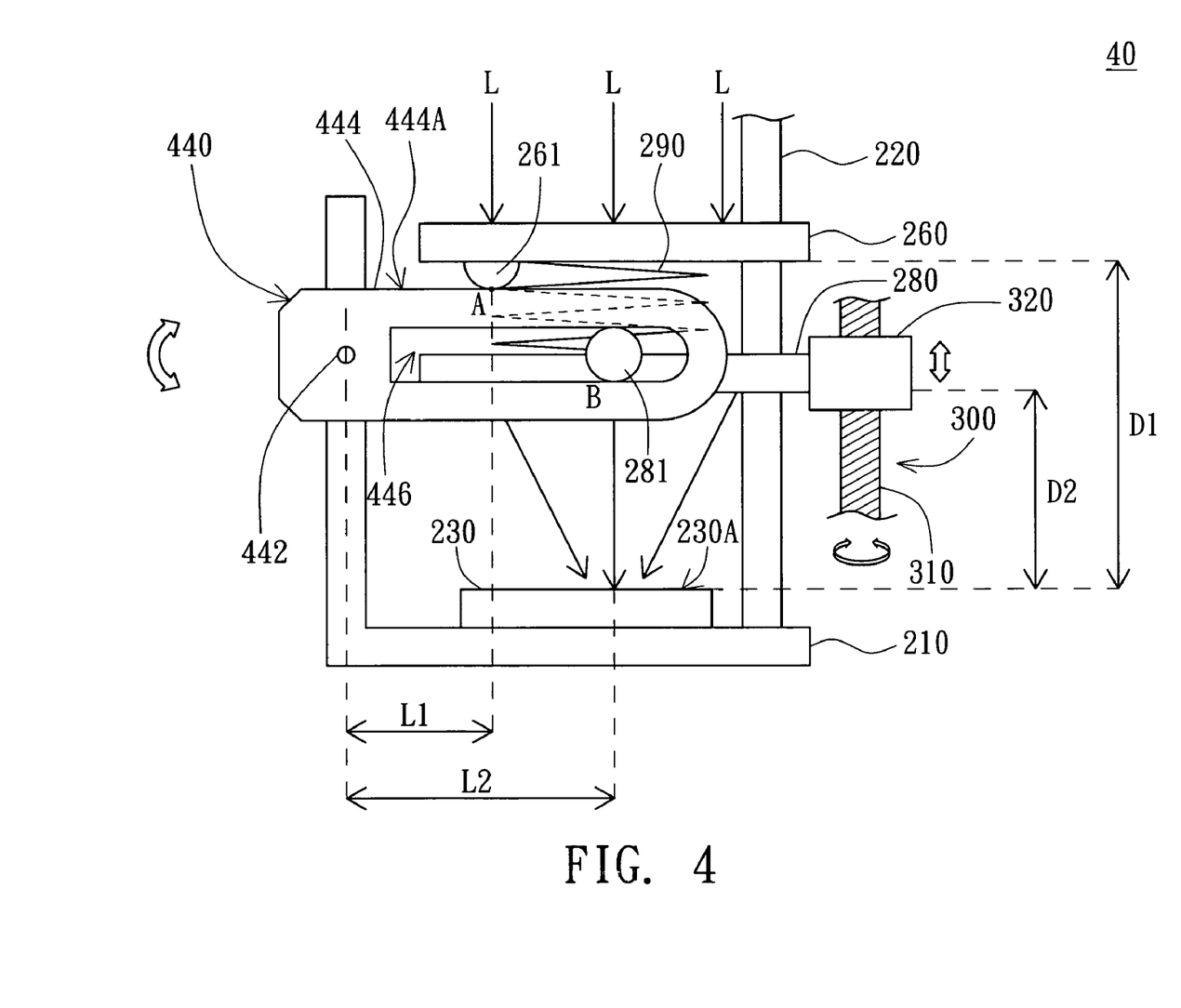
FIG. 4 illustrates a lens module according to a second embodiment of the present invention.

FIG. 4 illustrates a lens module according to a second embodiment of the present invention. Please referring to FIG. 4, the lens module 40 of the present embodiment and the lens module 20 of the first embodiment are different in the design of the lever 440 and the driving method of the lens module 40. The same components use the same reference numbers and are not described repeatedly. As shown in FIG. 4, the lever 440 includes the pivot part 442 and the extended part 444. A guiding groove 446 is formed on the extended part 444. The second bump 281 of the second lens 280 is leaned against an inner wall of the guiding groove 446. One part of the deceleration device is coupled with the second lens 280, and another part of the deceleration device is coupled with a driving unit. In the present embodiment, the deceleration device is a screwed device 300. The screwed device 300 includes a screwed rod 310 and a sleeve 320. The sleeve 320 is lodged with the screwed rod 310 through an inner thread. When the driving unit drives the screwed rod 310 to rotate, the sleeve 320 is driven to move along the screwed rod 310. Meanwhile, the second lens 280 is driven to move upwards or downwards for changing the second distance D2. When the second lens 280 moves upwards or downwards, the second bump 281 slides in the guiding groove 446. As a result, the extended part 444 is driven by the second lens 280 to rotate around the pivot part 442. Meanwhile, the first bump 261 leaned against the first surface 444A is also driven. As a result, the first distance D1 is changed.

Although the second lens 280 is leaned against the guiding groove 446 as an example in the present embodiment, the first bump 261 of the first lens 260 can also be leaned against the guiding groove 446. Therefore, the first lens 260 and the second lens 280 both are capable of sliding along the guiding groove 446.

Third Embodiment

Figure 5:
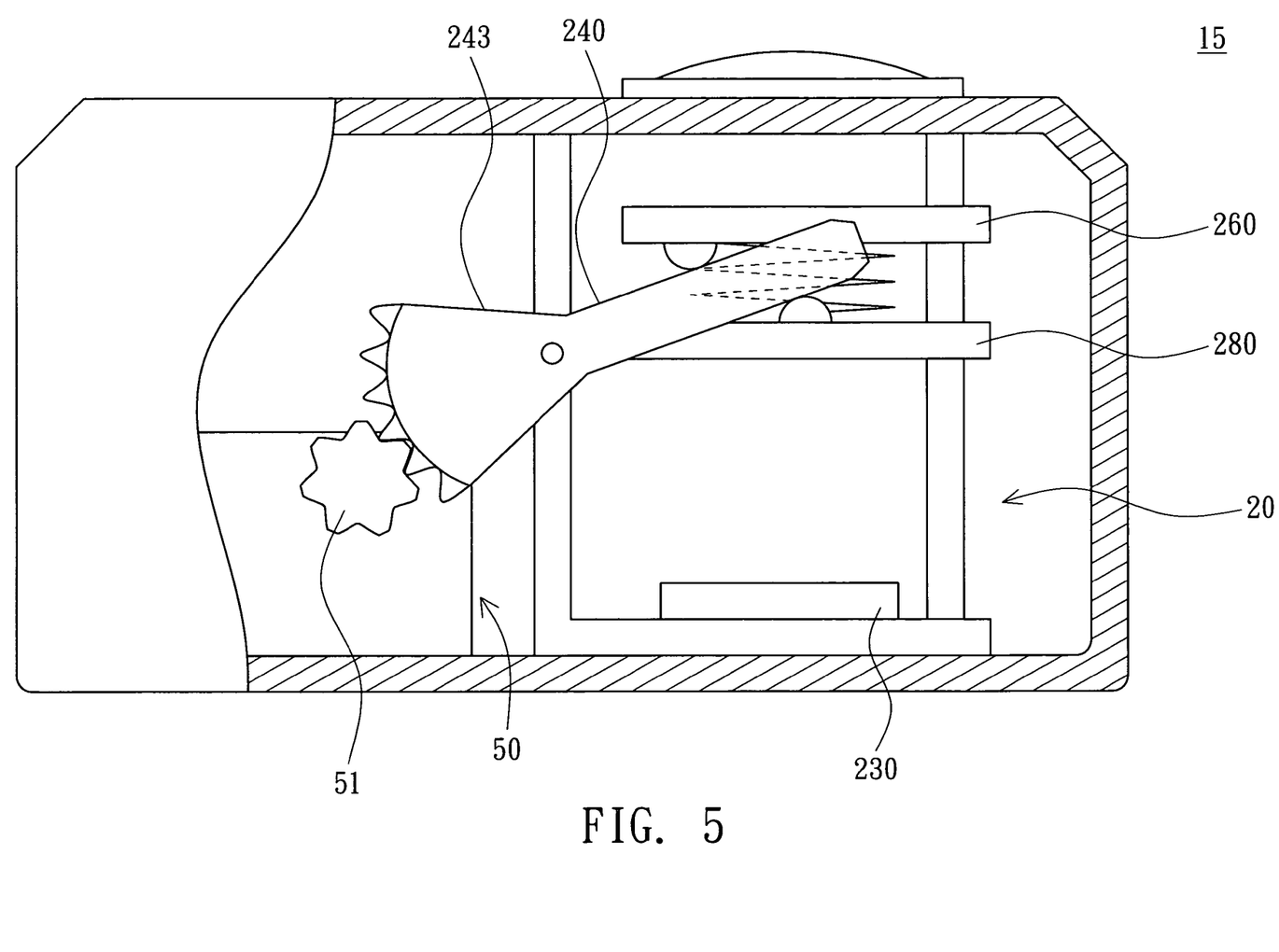
FIG. 5 illustrates an electronic device according to a third embodiment of the invention.

Please referring to FIG. 5, an electronic device according to a third embodiment of the invention is illustrated in FIG. 5. The electronic device 15, such as a camera, includes a driving unit 50 and a lens module. The lens module is the lens module 20 of the first embodiment for example. The driving unit 50 is coupled with the lens module 20 for changing the focal length of the lens module 20. The driving unit 50, such as a stepping motor, includes a gear 51 that is disposed on an output end of the driving unit 50 for engaging with the tooth-shape structure 243. When a user wants to adjust the focal length of the electronic device 15 to control the size of the image on the image sensor 230, the gear 51 is driven by the driving unit 50. As a result, the tooth-shape structure 243 engaging with the gear 51 is driven. The tooth-shape structure 243 is connected to the lever 240 of the lens module 20, and the first lens 260 and the second lens 280 are leaned against two opposite sides of the lever 240 respectively. Therefore, when the tooth-shape structure 243 rotates, the lever 240 is driven to rotate as well. Meanwhile, the lever 240 drives the first lens 260 and the second lens 280 at the same time, for changing the focal length of the electronic device 15.

In the lens module and the electronic device using the same according to the above embodiments of the present invention, the lever drives the first lens and the second lens to move relatively, so that the sensor distances of the first lens and the second lens are changed. The lever has the advantages including simple structure and low manufacturing cost. Additionally, it is easy to check the dimension of the lever, so that the required inspection time is reduced. Furthermore, the quantity of defective products is smaller, and the yield of the product is increased. As a result, the manufacturing cost is lowered.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens module comprising:
    a frame for carrying a image sensor having a photosensitive surface;
    a guide bar disposed on one side of the frame and parallel to a normal of the photosensitive surface;
    a lever comprising a pivot part and an extended part, the pivot part coupled with the frame, the extended part capable of rotating around the pivot part;
    a first lens coupled with the guide bar for sliding along the guide bar, the first lens leaned against the extended part, there being a first distance between the first lens and the photosensitive surface; and
    a second lens coupled with the guide bar for sliding along the guide bar, the second lens leaned against the extended part, there being a second distance between the second lens and the photosensitive surface;
    wherein the extended part drives the first lens and the second lens to move along the guide bar when the extended part rotates around the pivot part, for changing the first distance and the second distance;
    when the second lens moves along the guide bar for changing the second distance, the second lens drives the extended part to rotate around the pivot part, the first lens also driven to move along the guide bar, for changing the first distance.

2. The lens module according to claim 1, wherein the first lens is leaned against the extended part at a first position, there being a first moment arm between the first position and the pivot part, the second lens leaned against the extended part at a second position, there being a second moment arm between the second position and the pivot part, the first moment arm shorter than the second moment arm, so that a variation of the first distance is less than that of the second distance when the extended part rotates around the pivot part.

3. The lens module according to claim 1, wherein the first lens and the second lens are leaned against two opposite sides of the extended part.

4. The lens module according to claim 3, wherein the first lens further comprises a first bump, the first lens leaned against the extended part through the first bump, the second lens further comprising a second bump, the second lens leaned against the extended part through the second bump.

5. The lens module according to claim 3 further comprising:
    an elastic element connecting the first lens and the second lens for providing an elastic force, so that the first lens and the second lens are leaned against two sides of the extended part respectively.

6. The lens module according to claim 5, wherein the elastic element is a spring.

7. The lens module according to claim 1 further comprising:
    a deceleration device disposed on the lever and coupled with a driving unit, the driving unit driving the deceleration device, so that the extended part is driven to rotate around the pivot part.

8. The lens module according to claim 1 further comprising:
    a deceleration device disposed on the second lens and coupled with a driving unit, the driving unit driving the deceleration device to drive the second lens moving along the guide bar.

9. The lens module according to claim 8, wherein the deceleration device is a screwed device.

10. The lens module according to claim 1, wherein a guiding groove is formed on the extended part, the second lens leaned against an inner wall of the guiding groove, the second lens capable of sliding along the guiding groove.

11. An electronic device comprising:
a driving unit; and
a lens module coupled with the driving unit, the lens module comprising:
   a frame for carrying a image sensor with a photosensitive surface;
   a guide bar disposed on one side of the frame and parallel to a normal of the photosensitive surface;
   a lever comprising a pivot part and an extended part, the pivot part coupled with the frame, the extended part capable of rotating around the pivot part;
   a first lens coupled with the guide bar for sliding along the guide bar, the first lens leaned against the extended part, there being a first distance between the first lens and the photosensitive surface; and
   a second lens coupled with the guide bar for sliding along the guide bar, the second lens leaned against the extended part, there being a second distance between the second lens and the photosensitive surface;
wherein the extended part drives the first lens and the second lens to move along the guide bar when the extended part rotates around the pivot part, for changing the first distance and the second distance;
when the second lens moves along the guide bar for changing the second distance, the second lens drives the extended part to rotate around the pivot part, the first lens also driven to move along the guide bar for changing the first distance.

12. The electronic device according to claim 11, wherein the first lens is leaned against the extended part at a first position, there being a first moment arm between the first position and the pivot part, the second lens leaned against the extended part at a second position, there being a second moment arm between the second position and the pivot part, the first moment arm shorter than the second moment arm, so that a variation of the first distance is less than that of the second distance when the extended part rotates around the pivot part.

13. The electronic device according to claim 11, wherein the first lens and the second lens are leaned against two opposite sides of the extended part.

14. The electronic device according to claim 13, wherein the first lens further comprises a first bump, the first lens leaned against the extended part through the first bump, the second lens further comprising a second bump, the second lens leaned against the extended part through the second bump.

15. The electronic device according to claim 13 further comprising:
   an elastic element connecting the first lens and the second lens for providing an elastic force, so that the first lens and the second lens are leaned against two sides of the extended part.

16. The electronic device according to claim 15, wherein the elastic element is a spring.

17. The electronic device according to claim 11 further comprising:
   a deceleration device disposed on the lever and coupled with the driving unit, the driving unit driving the deceleration device, so that the extended part is driven to rotate around the pivot part.

18. The electronic device according to claim 11 further comprising:
   a deceleration device disposed on the second lens and coupled with the driving unit, the driving unit driving the deceleration device, so that the second lens is driven to move along the guide bar.

19. The electronic device according to claim 18, wherein the deceleration unit is a screwed device.

20. The electronic device according to claim 11, wherein a guiding groove is formed on the extended part, the second lens leaned against an inner wall of the guiding groove, the second lens capable of sliding along the guiding groove.

21. The electronic device according to claim 11, wherein the driving unit is a stepping motor.

22. The electronic device according to claim 11 being a camera.

* * * * *